Patented Aug. 7, 1951

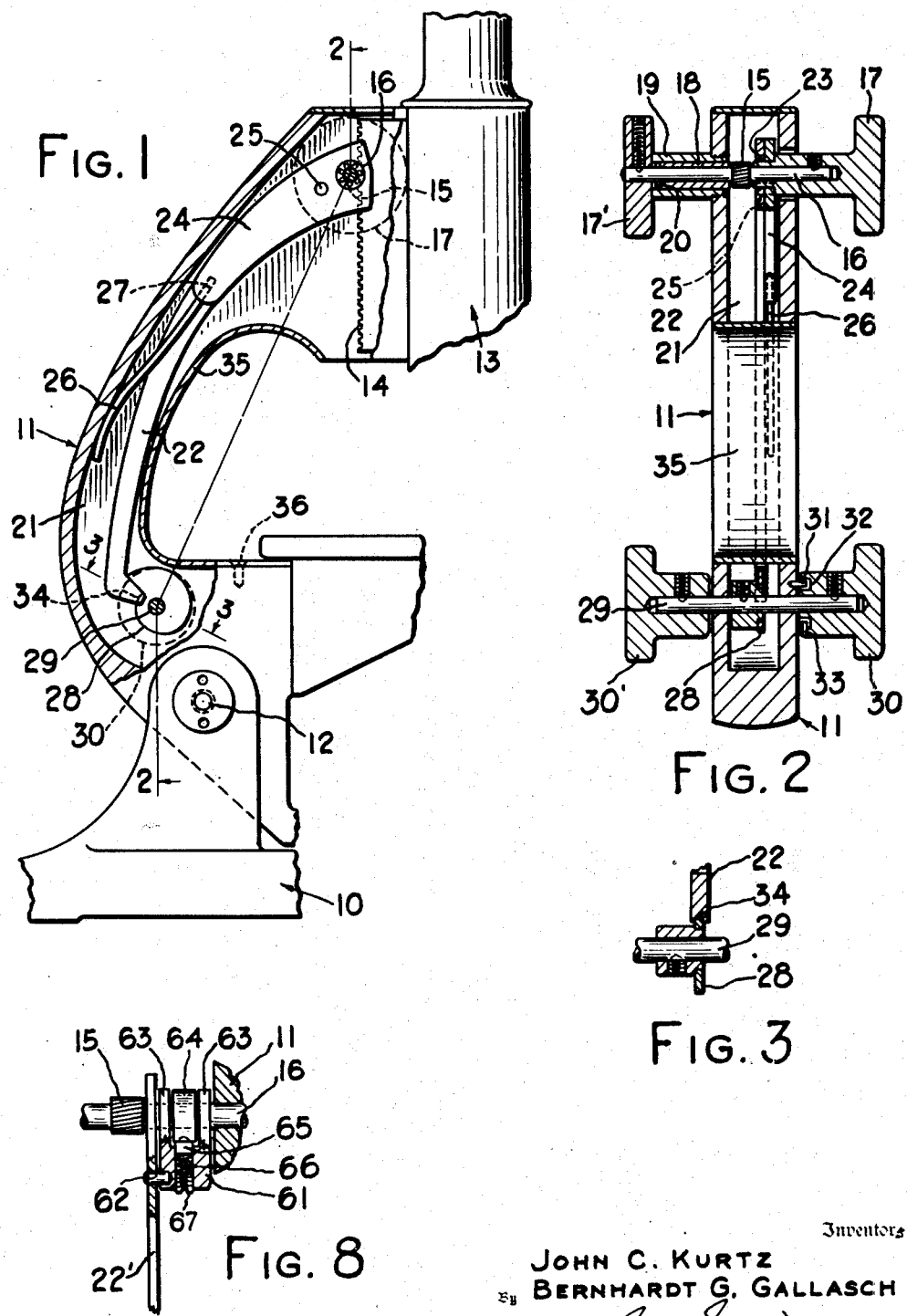

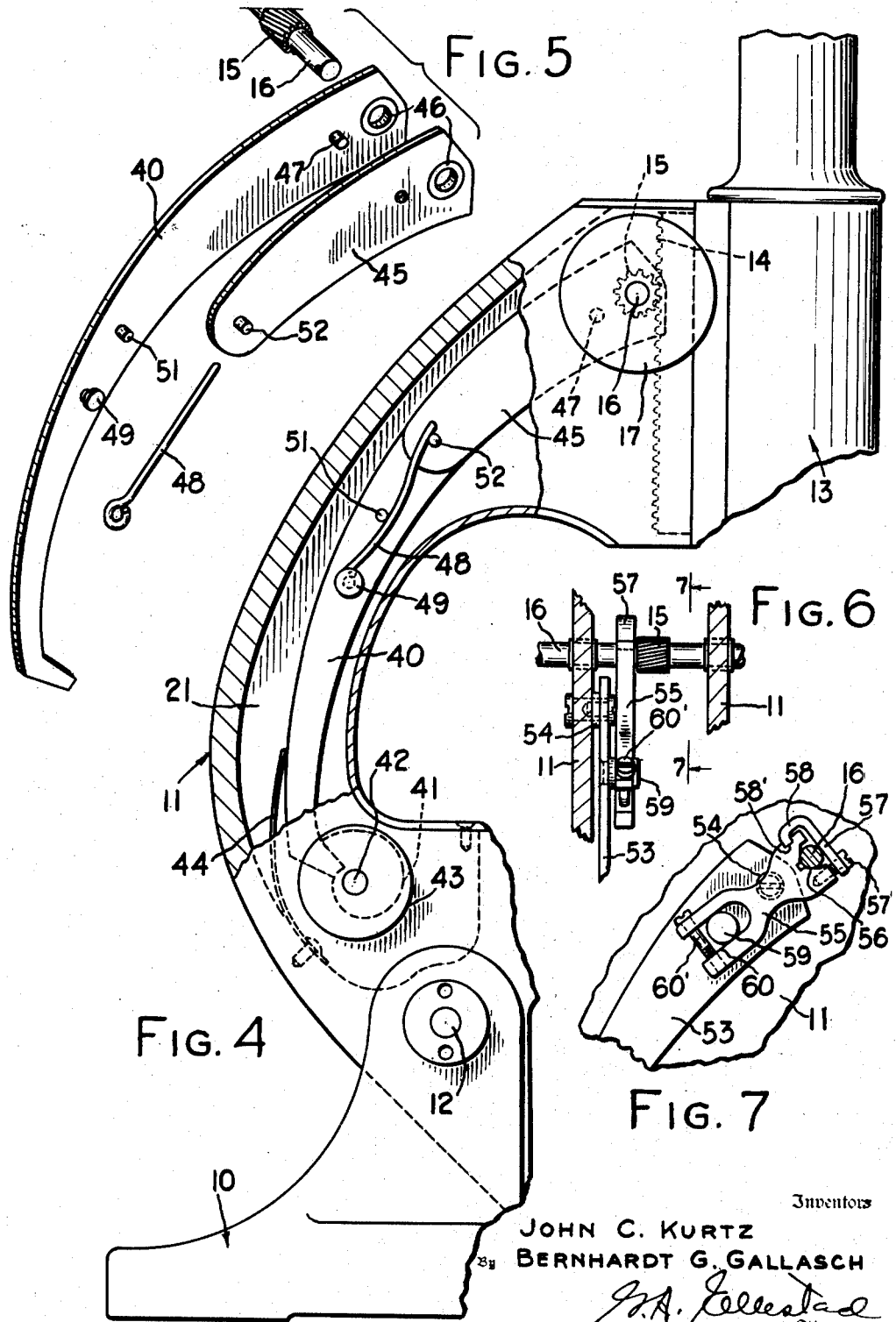

2,563,789

UNITED STATES PATENT OFFICE 2,563,789

MICROSCOPE FINE ADJUSTMENT

John C. Kurtz, Irondequoit, and Bernhardt G. Gallasch, Rochester, N. Y., assignors to Bausch & Lomb Optical Company, Rochester, N. Y., a corporation of New York Application September 13, 1947, Serial No. 773,864

10 Claims. (Cl. 88—39)

This invention relates to microscopes and more particularly to a fine adjustment focusing mechanism therefor.

One of the objects of this invention is to provide a novel fine adjustment mechanism for microscopes which is simple and compact in structure, easy to assemble, and inexpensive to manufacture.

It is another object to provide a relatively simple form of such a device which operates from a low position on a microscope without backlash throughout the entire range of motion of its focusing member.

It is still another object to provide such a device in which the coarse adjustment mechanism and fine adjustment mechanism are cooperatively associated and have some of their parts in common.

A further object is to provide in a microscope a fine adjustment mechanism wherein small movements are transmitted by a lever and cooperating torque limiting means.

Further objects and advantages will be apparent to those skilled in this art by reference to the following description and accompanying drawings in which:

Fig. 1 is a fragmentary side view, partly in section, of a microscope embodying a preferred form of the invention, Fig. 2 is a sectional view taken on the broken line 2—2 of Fig. 1, Fig. 3 is a sectional view taken on the line 3—3 of Fig. 1, Fig. 4 is a side view, partly in section, of a second embodiment of the invention, Fig. 5 is a perspective exploded view of certain details of the fine adjustment mechanism, Fig. 6 is a view of another embodiment of the torque limiting connection, Fig. 7 is a view taken on the line 7—7 of Fig. 6, and Fig. 8 is a view of a further modification of the torque limiting connection.

In the preferred form of the invention, the microscope comprises a base 10, a support arm 11 pivotally mounted at 12 and a lens tube 13 slidably mounted on the support arm. For moving the lens tube 13 relative to the arm 11, a coarse adjustment mechanism is provided including a rack 14 attached to the lens tube 13 and meshed with a pinion 15 fixed to an operating shaft 16 which is rotatably journaled in the arm 11. Coarse adjustment operating shaft 16 is extended at both ends beyond the arm 11 so that suitable knobs 17 and 17' may be fixed thereto for rotating the shaft. For the purpose of removing backlash from the rack and pinion connection, the shaft 16 is solely supported in an eccentric bushing 18 which is rotatably fitted within a bearing sleeve 19 fixed in the arm 11. Open-ended slots 20 in the end of the eccentric bushing afford means for its rotation during removal of backlash after the knob 17' is removed. The hole in the supporting arm 11 through which the knob 17 projects is made considerably larger than the shank of the knob so as to avoid contact when the eccentric bushing is being adjusted. The support arm 11 has a hollow recess 21, extending substantially throughout its full length, in which the fine adjustment mechanism of this invention is enclosed and protected.

According to this invention, the fine adjustment mechanism comprises a principal lever 22 which is loosely journaled on a cylindrical surface 23 on the knob 17 adjacent the pinion 15 and extends downwardly through the hollow recess 21 to its actuating means near the bottom of the arm 11. A torque limiting connection or friction clutch of any preferred form may be used between the lever 22 and the shaft 16, but the torque capacity of the connection is limited so that upon rotation of the coarse adjustment knobs 17 and 17', the connection will slip readily. In this form of the invention, the connection comprises a clutch lever 24 loosely journaled on the extension 23 closely adjacent to the principal lever 22 and pivoted to the latter by a fulcrum or pivot pin 25 anchored on lever 22. The friction clutch is made effective by biasing the clutch lever 24 relative to the principal lever 22 around the fulcrum pin 25 thus, in effect, clamping the shaft 16 between the two levers.

Any suitable biasing member may be applied to the free end of the clutch lever 24 for biasing it in a direction to preload the frictional clutch connection, but in its preferred form, as shown in Figs. 1 and 2, the mechanism consists of a spring 26 having a modulus of elasticity such as to satisfy the preloading function. The spring is placed under stress between the lever mechanism and arm 11 so as to bias said lever about the fulcrum pin 25. The spring may be of any desired form such as the cantilever spring 26 one end of which is anchored in a hole 27 in the free end of the clutch lever 24 while the other end of the spring presses forcibly against the inner wall of the recess 21.

Principal lever 22 is extended downwardly within the recess 21 into cooperative position with the actuating means which may be of any desired form but is here shown as comprising a radial cam 28 which is fixedly mounted on an actuating shaft 29 journaled in the arm 11 and rotated by the fine adjustment knobs 30 and 30' fixed thereto. The arrangement of spring 26 not only provides a pre-loading force for the friction clutch, but also urges the free end of lever 22 into engagement with the cam 28. Stop means of any desired form may be used to limit rotation of the shaft 29 such as the stop pin 31 which is fixed in the arm 11 so as to project into a circular groove 32 athwart the plane of rotation of a fixed abutment pin 33 in knob 30.

To insure that the free end of the principal lever is prevented from lateral displacement on the surface of the radial cam 28, the former is provided with guiding means comprising a recessed contact face 34, slightly wider than the cam 28, wherein the cam rides. Since lever 22 is greatly elongated, it provides an operating leverage between the actuating means and the operating shaft 16 of great mechanical advantage so that relatively large movements of the end of lever 22 will move the lens tube 13 easily and smoothly through exceedingly small increments. This structure also gives the added advantage of a low position fine adjustment which allows the operator to focus the instrument while his hands rest on the table.

The fine adjustment mechanism is effectively protected against mechanical injury or entrance of foreign matter by securing a conforming cover plate 35 across the recess 21 on the inner face of the arm 11. The cover plate may be held in place by any suitable means such as screws 36.

When operating the fine adjustment mechanism of this form of the invention, rotation of the cam 28 by the knobs 30 and 30' causes the free end of the principal level 22 to swing about the axis of the coarse adjustment shaft 16 and rotate said shaft by means of the frictional connection through an identical angular displacement of small magnitude which is carried through the pinion and rack connection to raise and lower the lens tube . However, when the coarse adjustment mechanism is operated by turning knobs 17 and 17', the principal lever 22 is held stationary by the spring 26 and cam 28 and slippage occurs in the frictional connection between the lever 22 and operating shaft 16. The strength of the spring 26 and the location of the fulcrum pin 25 for the clutch lever 24 are so chosen that a reliable torsional connection is established between the lever 22 and the shaft 16 while limiting the torsional value of the connection so as to permit the knob 17 to be rotated easily and smoothly when coarse adjustments are made.

The second embodiment of the invention is illustrated in Figs. 4 and 5 and is in general appearance and utility similar to the first embodiment. All those parts of the microscope which are the same in both embodiments are given corresponding identifying numerals. In this embodiment, the fine adjustment mechanism comprises a principal level 40 loosely journaled directly on the shaft 16 and extending downwardly through the recess 21 in the support arm 11 to a radial type actuating cam 41 on which the free end of the lever rests . The cam is rotated by an actuating shaft 42 to which is attached the actuating knobs 43. A suitable spring 44 anchored at one end in the recess 21 of arm 11 is so placed that its other end yieldably presses the free end of the lever 40 against cam 41.

Similarly to the first embodiment, the frictional connection includes a clutch lever 45 but it is journaled directly on the shaft 16 and lever bushings 46 may be used in the mounting holes of both of said levers if desired. Fixed to the principal lever 40 is a fulcrum stud 47 on which the clutch lever 45 is pivotally held whereby the clutch lever 45 can be biased relative to the principal lever 40 to establish a cooperative frictional grip therebeween on shaft 16. As here disclosed, the free end of clutch lever 45 is biased by a suitable clutch spring 48 anchored at one end on a retaining stud 49 fixed to lever 40 and held under bending stress by a fixed pin 51 in the lever 40 and a fixed pin 52 in the free end of clutch lever 45.

Since the operation of this embodiment is essentialy the same as that of the first embodiment, it is not here separately described.

Another form of torque-limiting connection is represented in Figs. 6 and 7 wherein a principal level 53 is individually pivoted on a pivot stud 54 fixed in the support arm 11 separately from the coarse adjustment shaft 16. It is understood that lever 53 extends downwardly within the arm so that the free end thereof engages a rotatable cam such as shown in Figs. 1 and 4. For communicating motion of the lever 53 to the shaft 16, a lever connection and friction clutch for gripping shaft 16 of any desired form may be employed but, as here shown, a unitary construction is chosen which provides a compound lever between the shaft 16 and its actuating means. In this construction, a connecting lever 55 is seated by means of the V-shaped recess 56 upon the shaft 16 and is held thereon by a clamping strip 57 and clamping screw 57'. The clamping strip 57, which may be of spring material if desired, is formed with a reverse bend 58, the end of which is held in a notch 58' in lever 55 thus providing a pivotal anchorage therefor. The amount of torque transmitted through the friction clutch to the shaft 16 may be governed by the pressure setting of the screw 57'. The other end of the lever 55 is moved by an actuating stud 59 fixed on the principal lever 53, said stud having a snug sliding fit within an elongated slot 60 in the lever 55. In locating the actuating stud 59 on lever 53, a leverage position relative to the pivot stud 54 is chosen so that the compound lever, provided by the assembly of levers 53 and 55, has the desired degree of power. Adjustment of the freedom of the sliding fit between the stud 59 and slot 60 is preferably effected by the adjusting screw 60'.

In operation, movement of the lower end of the lever 53 by its actuating means about the pivot stud 54 causes the actuating stud 59 to rise and fall thus carrying the lever 55 in a swinging motion of very slight magnitude which is imparted to the shaft 16 through the friction clutch, whereby a fine adjustment mechanism is provided for the lens tube 13. By reason of the cooperative action of levers 53 and 55, a compound lever is provided by which more delicate focusing movements of the lens tube can be accomplished than are possible with the other forms of this invention.

In Fig. 8 of the drawings, a modified form of frictional clutch is shown in which the principal lever 22' forms no part of the clutch. The clutch includes a bifurcated body member 61 journaled on the shaft 16 closely adjacent the lever member 22' and connected to the lever 22' for rotation in unison therewith solely by a shear pin 62. Between the furcations 63 of the body member 61, a collar 64 is loosely journaled on the shaft 16. Collar 64 is provided with a suitable indentation in its peripheral surface in which a mating detent 65 is forcibly seated by the action of a compression spring 66. Means for varying the amount of pressure between the active frictional surfaces of the collar 64, the furcations 63, and the shaft 16 are preferably supplied by a screw 67 bearing against the end of the spring 66.

When the lever 22' is swung about the axis of the shaft 16, its motion is transmitted through the shear pin 62 to the body member 61 and detent 65 to the collar 64. Inasmuch as the mutually opposite forces established by spring 66 on the collar 64 and furcations 63 set up a frictional drag force on the shaft 16, the movement of lever member 22' causes rotation of said shaft.

It is readily apparent that the friction clutch shown in Fig. 8 is complete per se and various other types of independent clutches might be used, either in connection with the lever 22' or together with alternate forms of connecting levers between the actuating mechanism and the shaft 16 within the scope of this invention.

It will be seen that there is here provided a fine adjustment mechanism in cooperation with a coarse adjustment mechanism wherein the lever mechanism and torque limiting connection permit easy, accurate and reliable operation throughout the range of adjustment of the instrument in accordance with the objects of this invention. While the novel fine adjustment mechanism has been shown as applied to a microscope for effecting focusing adjustments of the lens tube, it is obvious that it could be equally well applied to microscopes in which the focusing adjustments are made by moving the stage rather than the lens tube.

Although but certain embodiments of this invention have been shown and described in detail, it will be understood that other embodiments are possible and changes may be made in the form and arrangement of the parts and substitutions may be made therein without departing from the spirit of the invention as defined in the appended claims in which we claim:

1. The combination in a microscope having a movable lens tube and a rotatable shaft operatively connected thereto by which coarse adjustments are imparted to the tube of a principal lever having one end carried by and journaled coaxially with said shaft, a clutch lever carried by and journaled coaxially with said shaft adjacent said principal lever, said clutch lever being pivotally connected to the principal lever, means for biasing the clutch lever about its pivotal connection to establish a torsional connection between said principal lever and said shaft, and actuating means for moving the other end of said principal lever whereby fine adjustments of said lens tube may be effected.

2. In a microscope having a support, a member slidably mounted thereon for focusing adjustments and a shaft rotatably mounted adjacent said member and operatively connected thereto for effecting coarse adjustments thereof, the combination of a compound lever pivoted at one end on said support adjacent said member, a frictional clutch operatively connecting one end portion of said lever to said shaft, the clutch being in constant engagement with the shaft but permitting slippage when the shaft is moved to effect fine adjustments, and actuating means applied at the other end of the compound lever for effecting minute movements thereof whereby fine adjustments of said member may be effected.

3. A microscope having a hollow support arm, a lens tube slidably supported on the upper end of said arm, a rotatable shaft journaled in the upper part of said arm and operatively connected to move said lens tube, means for effecting fine adjustments of the tube comprising in combination an elongated lever extending downwardly and interiorly of said arm and journaled at its upper end about said shaft, a fulcrum pin fixed on said lever, a clutch lever journaled at one end about said shaft and pivotally connected to said fulcrum pin adjacent said elongated lever, and a spring anchored on said elongated lever and bearing forcibly on the other end of said clutch lever to apply a turning moment thereto about the fulcrum pin whereby the elongated lever is clutched to said shaft, and actuating means mounted on the lower part of the arm for moving the lower end of the elongated lever whereby the lens tube may be moved for fine adjustment focusing.

4. A microscope having a hollow support arm, a lens tube slidably supported on the upper end of said arm, a rotatable shaft journaled in the upper part of said arm and operatively connected to move said lens tube, means for effecting fine adjustment of the tube comprising a cylindrical surface fixed concentrically on said shaft, a principal lever loosely journaled at its upper end on said surface interiorly of said arm, a clutch lever loosely journaled at one end on said surface adjacent the principal lever, a pivot pin fixed to the principal lever, said clutch lever being in pivotal engagement with said pin, an actuating member for moving the lower end of said principal lever, and resilient means bearing against the free end of said clutch lever and reacting with said support arm for causing the clutch lever to torsionally grip the shaft and coincidentally force the lower end of the elongated lever against the actuating member whereby operation of the actuating member will effect fine adjustment of the lens tube.

5. In a microscope having a support arm, a lens tube slidably supported on the upper end of said arm, a rotatable shaft journaled in said arm and operatively connected to move said tube, the combination of means for effecting fine adjustment of said tube including a cylindrical surface concentrically on and rotatable with said shaft, a principal lever rotatably mounted at its upper end on said surface, a pivot stud fixed to said lever, a clutch lever rotatably mounted on said surface along the side of the principal lever and pivotally engaged with said stud, spring means for biasing the clutch lever relative to the principal lever about said stud so as to grip said surface between said levers, a rotatable cam operatively positioned at the lower end of said principal lever for imparting motion thereto, and an actuating shaft fixed to said cam and journaled in said arm whereby rotation of the cam produces fine adjustments of the lens tube.

6. In a microscope having a support arm, a lens tube slidably supported on the upper end of said arm, a rotatable shaft journaled in said arm and operatively connected to move said tube, the combination of means for effecting fine adjustment of said tube including, a principal lever having its upper end rotatably carried by the shaft, a pivot stud fixed to said lever, a clutch lever rotatably carried by the shaft along the side of the principal lever and pivotally engaged with said stud, spring means for biasing the clutch lever relative to the principal lever about said stud so as to grip said shaft between said levers, an actuating shaft rotatably journaled in the lower part of said arm, a cam fixed on the actuating shaft in operative contact with the lower end of said principal lever, and guiding means on the contact face at the lower end of the principal lever cooperating with said cam to prevent relative lateral displacement therewith, whereby actuation of said cam effects fine adjustments of said lens tube.

7. In a microscope having a hollow support arm, a movable member slidably supported on said arm, a rotatable shaft journaled in said arm adjacent said member and operatively connected to move said member, the combination of means for effecting fine adjustment of said member comprising a cylindrical surface fixed concentrically on said shaft, a compound lever pivotally mounted at one end on said surface within said arm, a preloaded torque limiting connection operatively and permanently connecting said compound lever and said surface to transmit motion of said lever to said shaft, a spring for preloading said torque limiting connection, cam means operatively positioned in contact with the other end of said compound lever and means for moving the cam means for imparting motion to the lever whereby fine adjustment motions are transmitted to the movable member.

8. In a microscope having a hollow support arm, a member slidably mounted thereon for focusing adjustments and a shaft rotatably mounted adjacent the member and operatively connected thereto for effecting coarse adjustments thereof, the combination of a lever positioned within the arm and having its upper end pivotally carried by the arm adjacent the member, a frictional clutch connection permanently and operatively connecting the lever to said shaft, the clutch connection being in constant engagement with the shaft but permitting slippage when the shaft is moved to effect fine adjustments, rotatable cam means carried by the lower part of the arm, said cam means being in operative engagement with the lower end of the lever whereby rotation of the cam means will effect a fine adjustment of the member.

9. In a microscope having a hollow arm, a lens tube slidably mounted thereon for focusing adjustments and a shaft rotatably carried by the arm and operatively connected to the lens tube for effecting coarse adjustments of the lens tube, the combination of a principal lever positioned within the arm and having its upper end carried by and journaled coaxially with the shaft, a clutch lever positioned within the arm adjacent the principal lever, one end of the clutch lever being carried by and journaled coaxially of the shaft, a pivotal connection between the two levers, means for biasing the clutch lever about the pivotal connection to establish a permanent torsional connection between the principal lever and the shaft, a cam rotatably mounted within the lower part of the arm with the cam in operative engagement with the lower end of the principal lever whereby rotation of the cam will produce fine adjustments of the lens tube.

10. A microscope having a support arm, a lens tube slidably carried by the arm, a shaft rotatably carried by the arm adjacent the tube, means operatively connecting the tube to the shaft whereby the shaft may be rotated to produce coarse adjustments of the lens tube for focusing, a vartically disposed lever having its upper end pivotally carried by the arm, frictional clutch means permanently and operatively connecting the upper end of the lever to said shaft, the clutch means being in constant engagement with the shaft but permitting slippage when the shaft is moved to effect coarse adjustments, and means for moving the lower end of the lever for producing small angular movements of said shaft to effect fine focusing adjustments of said lens tube.

JOHN C. KURTZ.
BERNHARDT G. GALLASCH.

REFERENCES CITED

The following references are of record in the file of this patent:

UNITED STATES PATENTS

| Number | Name | Date |
| --- | --- | --- |
| 1,488,118 | Hill et al. | Mar. 25, 1924 |
| 1,984,127 | Gallasch | Dec. 11, 1934 |

FOREIGN PATENTS

| Number | Country | Date |
| --- | --- | --- |
| 787,105 | France | June 24, 1935 |